United States Patent [19]
Germain et al.

[11] Patent Number: 6,070,416
[45] Date of Patent: Jun. 6, 2000

[54] METHOD AND DEVICE FOR SEQUENTIALLY SPRAYING A CRYOGENIC LIQUID, COOLING METHOD AND INSTALLATION MAKING APPLICATION THEREOF

[75] Inventors: Jean-Pierre Germain, Montigny le Bretonneux; Thierry Dubreuil, Boissets, both of France

[73] Assignee: L'Air Liquide, Societe Anonyme pour l'Etude et l'Exploitation des Procedes Georges Claude, Paris, France

[21] Appl. No.: 09/121,905

[22] Filed: Jul. 24, 1998

[30] Foreign Application Priority Data

Aug. 1, 1997 [FR] France .................................. 97 09910

[51] Int. Cl.$^7$ .................................................... F17C 17/02
[52] U.S. Cl. ................... 62/63; 62/52.1; 62/374
[58] Field of Search ................... 62/52.1, 63, 374

[56] References Cited

U.S. PATENT DOCUMENTS

| | | |
|---|---|---|
| 4,075,869 | 2/1978 | Fitsall . |
| 4,745,762 | 5/1988 | Taylor . |
| 5,011,633 | 4/1991 | Neefe . |
| 5,035,750 | 7/1991 | Tada et al. . |
| 5,261,243 | 11/1993 | Dunsmore ................................ 62/52.1 |
| 5,394,704 | 3/1995 | Johnson . |

FOREIGN PATENT DOCUMENTS

| | | |
|---|---|---|
| 125964 | 4/1984 | European Pat. Off. . |
| 0611933 | 8/1994 | European Pat. Off. . |
| 4410503 | 9/1994 | Germany . |
| 2276440 | 9/1994 | United Kingdom . |

OTHER PUBLICATIONS

Copy of EP Search Report No. 98 40 1638 dated Nov. 11, 1998.

Gromley, T.R., "A Laboratory Scale Liquid Nitrogen Freezer," *Irish Journal of Agricultural Research*, vol. 14, No. 2, 1975, 214–217.

*Primary Examiner*—Ronald Capossela
*Attorney, Agent, or Firm*—Nixon Peabody LLP; Robert M. Schulman

[57] ABSTRACT

Method of sequentially spraying a cryogenic liquid comprising sequentially applying a dose of a propellant gas to a dose of the cryogenic liquid and sequentially spraying this liquid, the pressure of the propellant gas being greater than that of the cryogenic liquid.

16 Claims, 1 Drawing Sheet

METHOD AND DEVICE FOR SEQUENTIALLY SPRAYING A CRYOGENIC LIQUID, COOLING METHOD AND INSTALLATION MAKING APPLICATION THEREOF

BACKGROUND OF THE INVENTION (i) Field of the Invention

The present invention relates to a method of sequentially spraying a cryogenic liquid, in particular liquid nitrogen.

The invention applies more particularly to the cooling, crusting and freezing of individual food products on their production line. In applications of this type, nozzles which are sequentially fed with liquid nitrogen spray liquid nitrogen onto each food product which is being conveyed.

(ii) Description of Related Art

Optimization of the cooling heat transferred between the jets of sprayed liquid nitrogen and the products to be cooled leads to the choice of drop sizes of between about 10 and 30 microns for the sprayed nitrogen. This dimensional constraint on the drops leads to a constraint on the pressure of the liquid nitrogen feeding the spray nozzles, which must also lie within a certain range.

This pressure constraint limits the reduction in the temperature of the liquid nitrogen feeding the spray nozzles. However, this reduction may itself lead to an increase in the cooling capacity of the liquid-nitrogen spray jets which are produced.

SUMMARY AND OBJECTS OF THE INVENTION

The object of the invention is to solve the problems mentioned above and, in particular, to provide a method of sequentially spraying liquid nitrogen which makes it possible simply and economically to increase the cooling capacity of the spray jets which are produced, while meeting the requirements in terms of the diameter of the drops which are produced.

To this end, the invention relates to a method of sequentially spraying a cryogenic liquid, in particular liquid nitrogen, characterized in that a dose of a propellant gas is sequentially applied to a dose of the cryogenic liquid, in order to sequentially spray this liquid, the pressure of the propellant gas being greater than that of the cryogenic liquid.

According to particular embodiments, the method may include one or more of the following characteristics:

the propellant gas is at a temperature very much greater than that of the cryogenic liquid, in particular close to ambient temperature, and the propellant gas and the cryogenic liquid are of the same composition.

The invention also relates to a method of cooling objects, more particularly food products, by spraying a cryogenic coolant, in particular liquid nitrogen, onto them, characterized in that use is made of a spraying method as defined above in order to spray the cryogenic liquid onto the objects which are being carried by conveyor means.

The invention also relates to an installation for implementing a cooling method as defined above, characterized in that it comprises means for conveying the objects, a source of cryogenic coolant, a source of propellant gas, the pressure of the propellant gas being greater than that of the cryogenic liquid, and a device for sequentially spraying the cryogenic coolant, this device comprising, on the one hand, a duct of which an outlet is connected to an inlet of spraying means directed at the said conveyor means, and on the other hand distribution means which selectively and sequentially connect an inlet of the said duct to the gas and liquid sources.

According to a particular embodiment, the distribution means comprise at least one distribution solenoid valve controlled by a drive unit, and in that the spraying means comprise a spray nozzle.

Lastly, the invention relates to a device for sequentially spraying cryogenic liquid, for an installation as defined above, characterized in that it comprises, on the one hand, a duct of which an outlet is connected to an inlet of spraying means, and on the other hand distribution means designed to selectively and sequentially connect an inlet of the duct to a cryogenic liquid source and to a propellant gas source.

The invention will be understood more clearly on reading the following description, which is given solely by way of example and is made with reference to the appended drawings.

DETAILED DESCRIPTION OF PREFERRED EMBODIMENTS

Figures 1, 2:
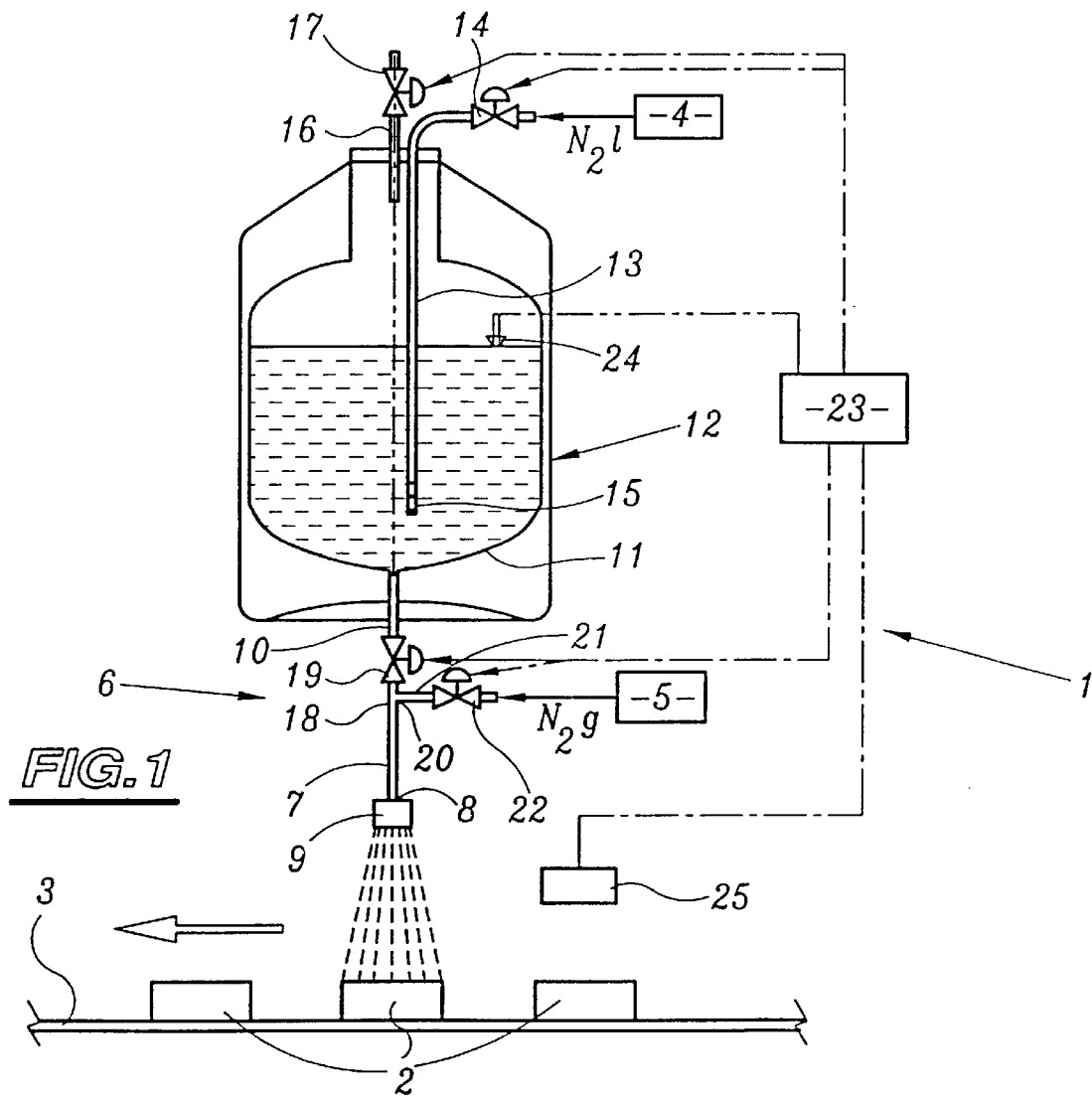
FIG. 1 is a schematic elevation of a cooling installation according to the invention, and FIG. 2 combines two time diagrams which comparatively illustrate the sequences of opening the solenoid valves of the installation in FIG. 1.

FIG. 1 represents an installation 1 for cooling chocolate biscuits 2 by spraying liquid nitrogen onto them.

This installation comprises substantially horizontal conveyor means 3, on which the biscuits 2 are arranged uniformly after manufacture. The conveyor means 3 may, for example, consist of part of a final conveyor of the chocolate-biscuit production line.

The cooling installation also comprises a liquid nitrogen source 4 and a nitrogen gas source 5 which are connected to a device 6 for sequentially spraying liquid nitrogen, which is on top of the conveyor means 3.

The device 6 comprises a substantially vertical duct 7 in the form of a tube, of which an outlet 8 is connected to the inlet of a spray nozzle 9 of the FULLJET (registered trademark) type with full-cone spray jets. The nozzle 9 is directed at the conveyor means 3, and its axis is substantially orthogonal to them, that is to say substantially vertical.

The inlet of the duct 7 is connected, via a pipe 10, to the bottom 11 of a heat-insulated tank 12 containing liquid nitrogen in equilibrium with its gas phase.

This tank 12 is connected, via a liquid nitrogen feed pipe 13 along which a solenoid valve 14 is arranged, to the liquid nitrogen source 4. The downstream end 15 of the pipe 13 is immersed in the liquid nitrogen contained in the tank 12.

In its upper part, this tank 12 comprises a pipe 16 for venting the gas atmosphere contained in the tank 12. The pipe 16 is provided with a solenoid valve 17.

The pipe 10 is connected to the inlet 18 of the duct 7 via a solenoid valve 19.

The inlet 18 of the duct 7 is connected to the source 5 by branching, immediately downstream of the solenoid valve 19, a pipe 21 provided with a solenoid valve 22. This branching is identified by the reference 20 in FIG. 1. For the sake of clarity in the representation, this branching has been moved away from the solenoid valve 19.

The installation furthermore includes an electronic unit 23 for driving the opening of the solenoid valves 14, 17, 19 and 22. This drive unit 23 is also connected, on the one hand, to a level sensor 24 for the liquid nitrogen contained in the tank 12, and on the other hand to a sensor 25 which is intended to detect the presence of biscuits 2 to be cooled and is arranged above the conveyor means 3, upstream of the spraying device 6 relative to the direction in which the biscuits 2 move, this being shown by an arrow.

The source 5 delivers dry nitrogen gas at an absolute pressure of about 1.5 bar and at ambient temperature. The source 4 delivers liquid nitrogen at an absolute pressure slightly greater than atmospheric pressure.

These sources 4 and 5 may consist of a nitrogen delivery network present on the biscuit production site, or a high-capacity liquid nitrogen tank and pressurized nitrogen gas bottles.

Virtually the entire length (a few centimeters) of the duct 7 lies between the branching at 20 and its outlet 8, which is connected to the feed inlet of the nozzle 9. The distance between the conveyor means 3 and the outlet of the nozzle 9 is about 15 cm.

The installation operates as follows.

The conveyor means 3 transport the biscuits 2 under the spraying device 6. With the solenoid valves 19 and 22 closed, when the sensor 25 detects the presence of a biscuit 2 to be cooled, the drive unit 23 triggers the opening of the solenoid valve 19, with the solenoid valve 22 remaining closed.

The inlet 18 of the duct 7 is therefore connected by the pipe 10 to the bottom 11 of the tank 12.

This tank contains liquid nitrogen at atmospheric pressure. The level of liquid nitrogen in this tank is adjusted to a substantially constant level by means of the solenoid valves 14 and 17, the sensor 24 and the drive unit 23.

The liquid nitrogen feeding the duct 7 is clean and its relative pressure corresponds to the hydrostatic pressure of the nitrogen, which is about 100 mbar. This liquid nitrogen flows into the duct 7, which is thus filled with a dose of liquid nitrogen.

Next, the drive unit 23 causes the solenoid valve 19 to close, and the solenoid valve 22 to open, thus connecting the inlet 18 of the duct 7 to the nitrogen gas source 5.

The nitrogen gas, with an absolute pressure of about 1.5 bar, therefore flows into the duct 7, pushing the dose of liquid nitrogen with which it is filled through the nozzle 9, thus causing the dose of liquid nitrogen to be sprayed onto the detected biscuit 2.

The solenoid valve 22 is then closed after the duct 7 has been supplied with a dose of nitrogen gas sufficient to spray the dose of liquid nitrogen with which the duct is filled, and the installation 1 is ready to cool another biscuit.

The nitrogen gas thus applied to the dose of liquid nitrogen acts as a propellant gas and makes it possible to achieve the desired drop sizes.

If, in order to deliver spray jets under the same conditions, with similar drop sizes, the nozzle 9 were fed only with liquid nitrogen, a liquid nitrogen feed at an absolute pressure of about 1.5 bar would be necessary. In the described embodiment, the liquid which is sprayed is at a relatively low absolute pressure, of the order of 1.1 bar, and therefore at a lower temperature.

It has been verified experimentally that the cooling capacity of the liquid-nitrogen spray jet which is delivered is increased even though the nitrogen gas used is at ambient temperature, and therefore at a temperature which is much greater than that of the liquid nitrogen coming from the tank 12 (about −196° C.).

The times for which the solenoid valves 19 and 22 are opened are, in the described embodiment, respectively between 0.3 and 0.5 seconds and between 0.1 and 0.3 seconds.

In general, the times for which the solenoid valve 19 is opened are between two and four times longer and preferably three times longer, than the times for which the solenoid valve 22 is opened.

The purpose of the tank 12 is, on the one hand, to ensure the delivery of clean liquid nitrogen to the spraying device 6 and, on the other hand, to provide control over the pressure and flow rate of the liquid nitrogen which is delivered.

When the products to be cooled are arranged uniformly on the conveyor means, as represented in FIG. 1, the opening of the solenoid valves 19 and 22 is sequential and periodic, as represented in the time diagrams in FIG. 2.

On these time diagrams, the states 1 and 0 correspond respectively to the open state and the closed state of a solenoid valve.

These time diagrams make it possible, by virtue of the two curves, identified by the letter L in the case of the solenoid valve 19 and by the letter G in the case of the solenoid valve 22, to display the alternate and sequential opening of these two solenoid valves.

These solenoid valves 19 and 22 and the drive unit 23 allow the inlet 18 of the duct 7 to be connected selectively and sequentially to the gas and liquid sources.

In another embodiment, the two solenoid valves 19 and 22 may be replaced by a three-way solenoid valve having two positions.

It will be understood that the sequential spraying method described above can be applied in a general way to the food industry, in particular for operations of cooling, optionally by spraying onto the supports of the products to be cooled, of crusting and of freezing.

The invention may be applied more generally to the cooling of many types of individual products in transit.

Depending on the applications envisaged, it will be possible to vary the pressures and temperatures of the liquid nitrogen and nitrogen gas feeding the device 6, the dimensions of the duct 7 which is used to accumulate the doses of liquid nitrogen, the times for which the solenoid valves 19 and 22 are opened and closed, as well as the relative proportion of the gas and liquid doses which are injected for each spraying operation. The described method may thus, for example, be employed with sources of liquid nitrogen at an absolute pressure of 1.8 bar or 2 bar (this pressure being controlled by the solenoid valve 17) and with sources of nitrogen gas at absolute pressures of 1.35 bar, 1.6 bar, 1.7 bar or 2.5 bar.

More generally, the propellant gas which is injected may be other than the cryogenic liquid to be sprayed. It is preferably a dry inert gas.

We claim:

1. Method of sequentially spraying a cryogenic liquid comprising sequentially applying a dose of a propellant gas to a dose of the cryogenic liquid and spraying this liquid, the pressure of the propellant gas being greater than that of the cryogenic liquid.

2. Method according to claim 1, wherein the propellant gas is at a temperature greater than that of the cryogenic liquid.

3. Method according to claim 2, wherein said propellant gas is close to ambient temperature.

4. Method according to claim 1 wherein the propellant gas and the cryogenic liquid are of the same composition.

5. Method according to claim 1, wherein said cryogenic liquid is liquid nitrogen.

6. Method of cooling objects comprising spraying a cryogenic coolant onto said objects by sequentially applying a dose of a propellant gas to a dose of a cryogenic liquid and spraying the cryogenic liquid onto the objects which are being carried by conveyor means, the pressure of the propellant gas being greater than that of the cryogenic liquid.

7. Method according to claim 6, wherein said objects are food products.

8. Method according to claim 6, wherein said cryogenic coolant is liquid nitrogen.

9. Installation for cooling objects by spraying a cryogenic liquid, comprising
- an object conveyor,
- a source of cryogenic liquid,
- a source of propellant gas, the pressure of the propellant gas being greater than that of the cryogenic liquid, and
- a device for sequentially spraying the cryogenic liquid comprising a duct including an outlet connected to an inlet of a sprayer directed at said conveyor and a distributor which selectively and sequentially connects an inlet of said duct to the gas and liquid sources.

10. Installation according to claim 9, wherein the propellant gas is at a temperature greater than that of the cryogenic liquid.

11. Installation according to claim 10 wherein the propellant gas is close to ambient temperature.

12. Installation according to claim 9 wherein the propellant gas and the cryogenic liquid are of the same composition.

13. Installation according to claim 9, wherein the distributor comprises at least one distribution solenoid valve controlled by a drive unit and wherein the sprayer comprises a spray nozzle.

14. Device for sequentially spraying cryogenic liquid comprising
- a duct including an outlet connected to an inlet of a sprayer and a distributor designed to selectively and sequentially connect an inlet of the duct to a cryogenic liquid source and to a propellant gas source.

15. Device according to claim 14, wherein the distributor comprises at least one distribution solenoid valve controlled by a drive unit and the sprayer comprises a spray nozzle.

16. Installation for cooling objects by spraying a cryogenic liquid, comprising means for conveying the objects,
- a source of cryogenic liquid,
- a source of propellant gas, the pressure of the propellant gas being greater than that of the cryogenic liquid, and
- a device for sequentially spraying the cryogenic liquid comprising a duct including an outlet connected to an inlet of a spraying means directed at said conveyor means and a distribution means which selectively and sequentially connects an inlet of said duct to the gas and liquid sources.

* * * * *